Sept. 8, 1953 J. J. B. LAIR 2,651,677
ELECTRICAL INTERCOMMUNICATION SYSTEM
Filed March 18, 1950 6 Sheets-Sheet 1
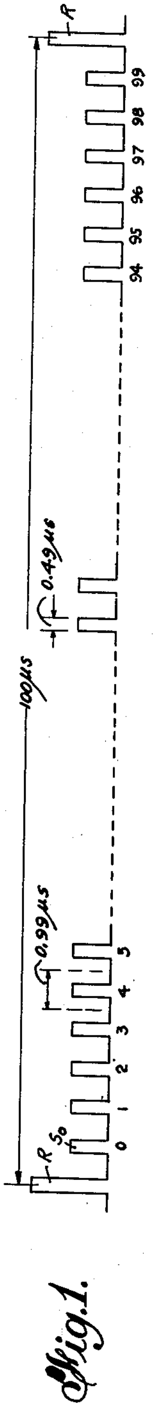
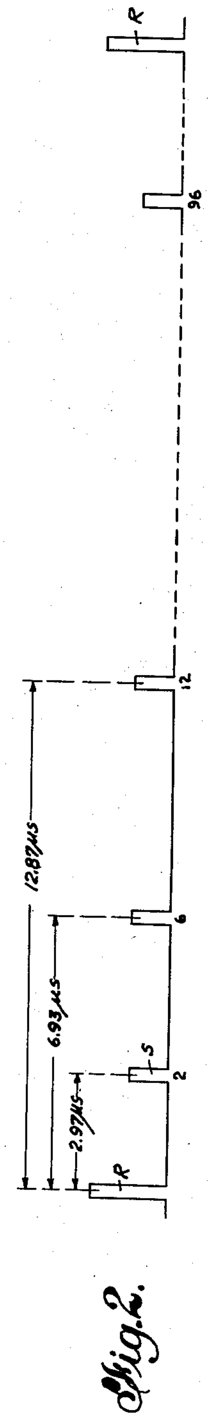
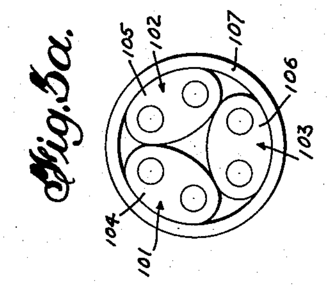
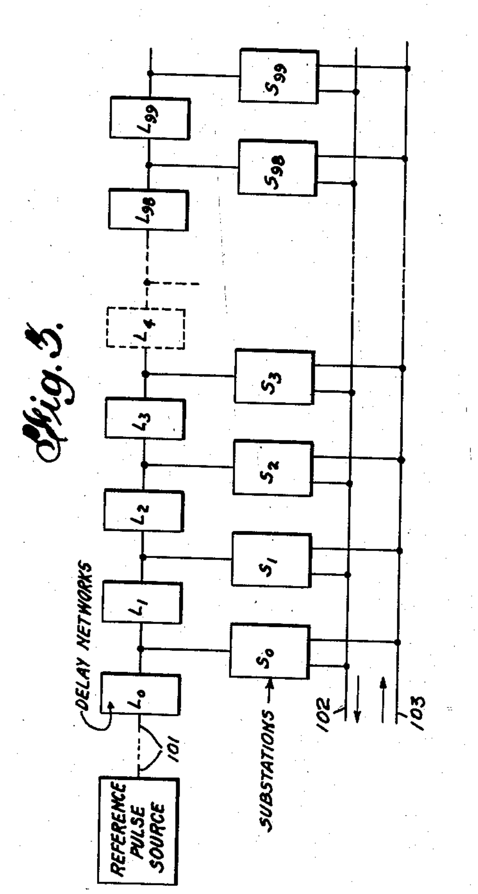
INVENTOR
JULIEN J. B. LAIR
BY [signature]
AGENT Sept. 8, 1953 J. J. B. LAIR 2,651,677

ELECTRICAL INTERCOMMUNICATION SYSTEM

Filed March 18, 1950

6 Sheets-Sheet 2

INVENTOR
JULIEN J. B. LAIR
BY
AGENT

Sept. 8, 1953 J. J. B. LAIR 2,651,677

ELECTRICAL INTERCOMMUNICATION SYSTEM

Filed March 18, 1950 6 Sheets-Sheet 3

INVENTOR
JULIEN J. B. LAIR
BY R. J. Perry
AGENT

INVENTOR
JULIEN J. B. LAIR
BY
AGENT

Sept. 8, 1953 J. J. B. LAIR 2,651,677

ELECTRICAL INTERCOMMUNICATION SYSTEM

Filed March 18, 1950

6 Sheets-Sheet 5

INVENTOR
JULIEN J. B. LAIR
BY [signature]
AGENT

Sept. 8, 1953 J. J. B. LAIR 2,651,677

ELECTRICAL INTERCOMMUNICATION SYSTEM

Filed March 18, 1950 6 Sheets-Sheet 6

INVENTOR
JULIEN J. B. LAIR
BY
AGENT

Patented Sept. 8, 1953

2,651,677

UNITED STATES PATENT OFFICE 2,651,677

ELECTRICAL INTERCOMMUNICATION SYSTEM

Jean Julien Baptiste Lair, Nutley, N. J., assignor to International Standard Electric Corporation, New York, N. Y., a corporation of Delaware Application March 18, 1950, Serial No. 150,437

9 Claims. (Cl. 179—15)

This invention relates to electrical switching systems and more particularly to switching systems of the kind employed in telecommunication, for example, in telephone, telegraph, etc., exchange systems.

The objects of the invention are to render the switching equipment less expensive to install and maintain in service than was heretofore practicable and to increase the speed at which desired interconnections are established.

The features of the invention and a detailed description of some preferred embodiments thereof will be described herein in connection with a telephone exchange system but it will be understood that the invention is not limited to telephone systems but is applicable to switching systems in general. Moreover, although a complete telephone switching system will be described as equipped according to the present invention some or all of the advantages of the invention can be derived from a partial application of one or more features herein disclosed and claimed in combination with elements of other known or unknown switching systems.

Heretofore it has been useful to employ electromechanical or electronic switches for establishing connections, e. g. for the purpose of connecting a calling subscriber's line with a wanted trunk. The switching devices employed at each connecting stage have comprised switches with movable wipers or have consisted of counting relays or a chain of electronic discharge tubes or the movable beam of a cathode ray tube or like device. This has been true with respect to the switching devices used to connect a predetermined or idle trunk with a calling one of a plurality of lines . . . the so-called line finder operation, or to connect a predetermined calling line with a certain one or an idle one of a group of outgoing trunks . . . the so-called line switching or trunk selecting operation, or to connect a trunk with a wanted subscriber's line . . . the so-called line selecting or connecting operation.

In accordance with the present invention any or all of the aforementioned switching operations are performed by static switching means or networks which effect the desired interconnections in a substantially instantaneous manner.

Considering first the so-called line switching or trunk selecting operation, there is provided in accordance with the invention, an electrical network the input of which may consist of a radio channel or transmission line. A plurality of calls, for example, calls originating at any one or more of say 100 telephone sub-stations connected with said line are directed to the network in spaced time relation with respect to one another. For instance, reference pulses are cyclically and periodically impressed on the line and any call initiated at a station associated with the line is represented by a train of periodic station pulses each of which follows preceding reference pulse and is separated from it by a predetermined time interval characteristic of the calling station. Each station will thus be accorded a space time channel on the transmission line and may convey intelligence thereover by modulating its station pulses the repetition rate of which is, of course, above the audible range. It will be appreciated that the intelligence may be conveyed in any known form of modulation, such as space time modulation, pulse width modulation, amplitude modulation, etc.

The output of the network comprises a plurality of trunks, the number of trunks depending, as in electromechanical switching systems, upon the amount of traffic which the network is expected to carry. If, for example, it is desired to afford for each one of the 100 sub-stations, in the case assumed above, simultaneous passage through the network to an individual trunk, then the network will have to be provided with 100 trunks serving as outlets. In this case the station pulse of any given station, or say at station No. 59, will be directed to the trunk outlet 59, the station pulse of station No. 78 to outlet trunk 78, etc., etc. Thus the trunk outlets of the network will temporarily serve as individual lines for the stations connected in common with one and the same input line.

According to one of the features of the invention the network comprises an artificial transmission line, i. e., a so-called delay line of such effective electrical length that the incoming station pulses will be positioned, respectively, opposite their individual outlet trunks which are connected to the delay line at different spaced points along its length. The transmission of the station pulses which pass into the outlets is normally blocked by a uni-lateral contact device, such as a rectifier, or by a controllable high impedance device, such as a suitably biased gating tube. Each reference pulse, one of which occurs ahead of each block of station pulses, is employed for controlling means for momentarily unblocking transmission between the line and all of the outlet trunks so that the station pulses which previously appeared in timed succession on the input line will now appear simultaneously, that is, in time alignment with one another at the output trunks with each pulse now separated from the others in space, that is, in its appropriate outlet. Hereafter in this description pulses appearing on a single line or channel separated only in time will be referred to as in succession and those appearing simultaneously at the inputs of a number of trunks will be described as in alignment.

It is not essential to provide a separate trunk outlet for each station having access to the input line since, as is well known in electromechanical switching systems, such stations may be so equipped that more than a certain percentage of simultaneous calls is unlikely to arise at any particular time: thus, twenty or fewer outlet trunks may be allocated to serve a group of 100 potential calling stations.

Networks similar to those previously described may also be used in the reverse direction, that is to say, aligned pulses applied to the 100 trunk outlets may be caused to pass into the common transmission line in properly spaced time succession.

The applications of the invention so far described have been concerned with non-numerical switching operations, that is, with the routing of a call incoming over a common line to a trunk individual to it or temporarily reserved for it. When the invention is applied to numerical switching operations, the system must be provided with a means for producing a variable delay depending upon a dialed number or some other indication given by the calling station. The input side of such a system will consist of a plurality of incoming lines or trunks on which calls may arrive. For instance, the input side may consist of the 100 or fewer output trunks of the non-numerical connecting stage previously described. Pulses on an input line of this system or network are modulated over a predetermined period of time in accordance with a digit of the wanted party's number called by the calling station and depending upon this modulation the network will produce a predetermined delay. Assuming a decimal system of selection, from 0 to 10 delay units may be produced by the network to position the incoming pulses opposite to a called one of 10 outlet trunks. The passage to the called outlet is normally blocked and is opened only at predetermined intervals, that is, at the same frequency as the repetition rate of the reference pulses and since this is well above the range of speech frequencies, the transmission of intelligible speech or other signal intelligence may be effected without interference from any audible tone produced by the pulses.

The output trunks of a non-numerical switching stage need not be permanently connected to a common line over a delay line. They may instead, be successively connected to the common line through the medium of some form of distributor which may, for example, be of the cathode ray type.

The numerical switching stage may provide selection in accordance with more than one digit of the called number, for example, 10 delay units may be produced in the network in accordance with a dialed "tens" digit and a single delay unit may be produced in accordance with a dialed "units" digit, thus routing the call to a desired one of 100 numerical outlets of the connecting stage. Obviously, "thousands" and "hundreds" digits may be used in similar manner to route calls through a single network.

The above described interconnecting operations will now be described in greater detail with reference to the accompanying drawings in which:

Fig. 1 illustrates the instantaneous distribution on a portion of a common transmission line of one complete block of station pulses with respect to the reference pulses at each end of the group or block;

Fig. 2 illustrates the instantaneous distribution on a portion of a common line of a number of calling station pulses with respect to reference pulses for the purpose of showing a typical normal condition of the common line when several of the stations are making calls at the same time;

Fig. 3 is a diagrammatic representation illustrating a plurality of stations connected in parallel with a common line;

Figure 4:
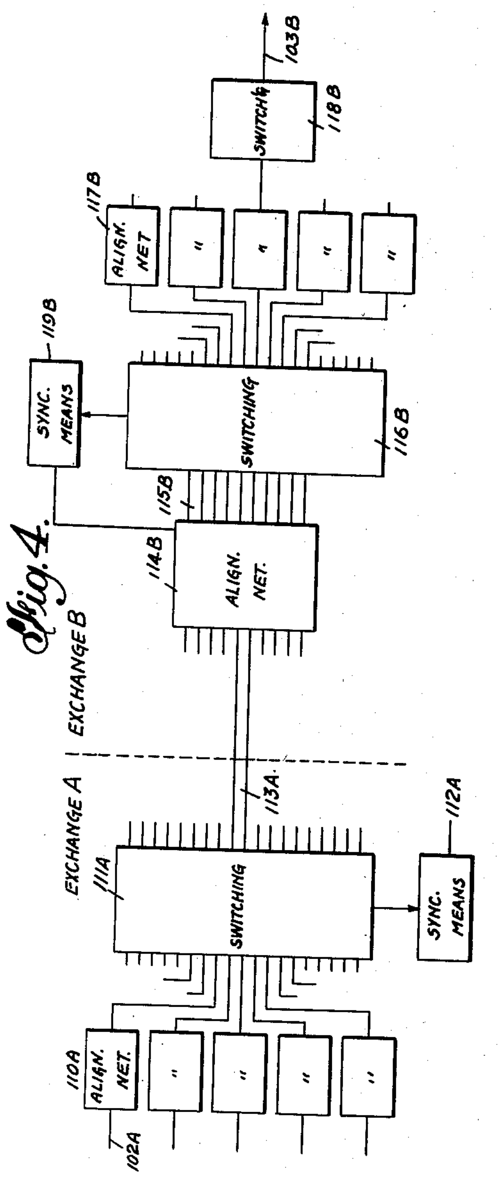
Figure 5:
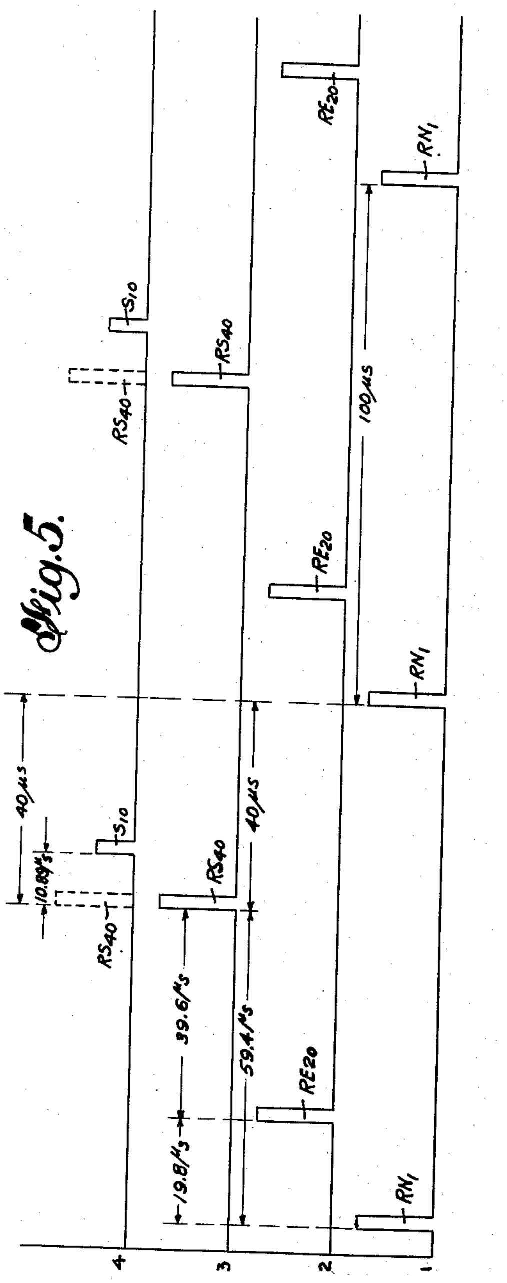
Figure 6:
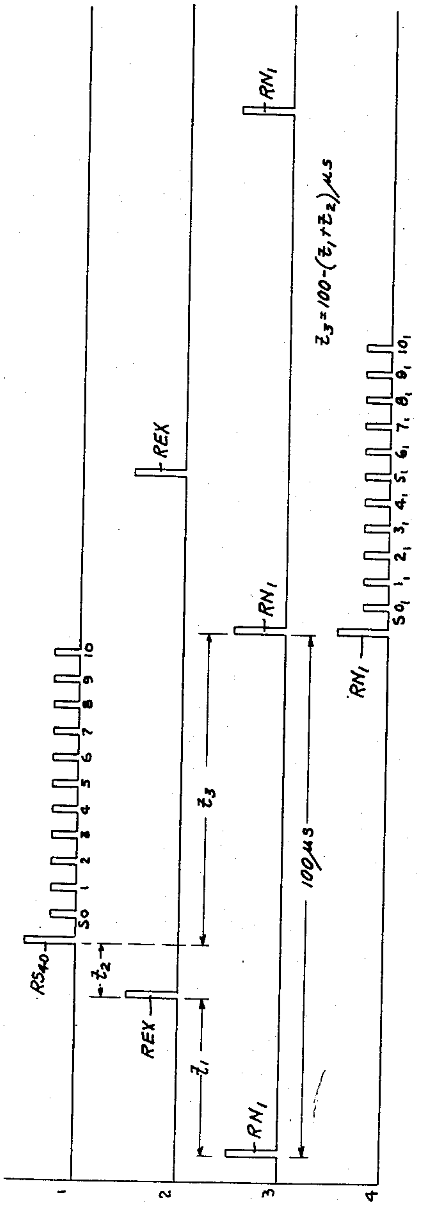
Figure 7:
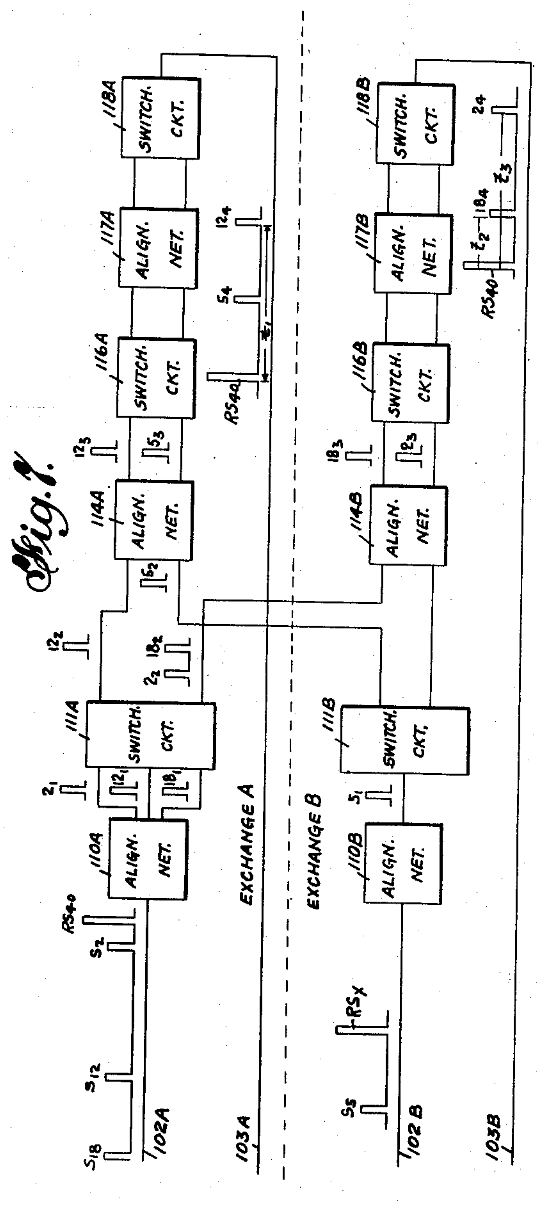
Figure 8:
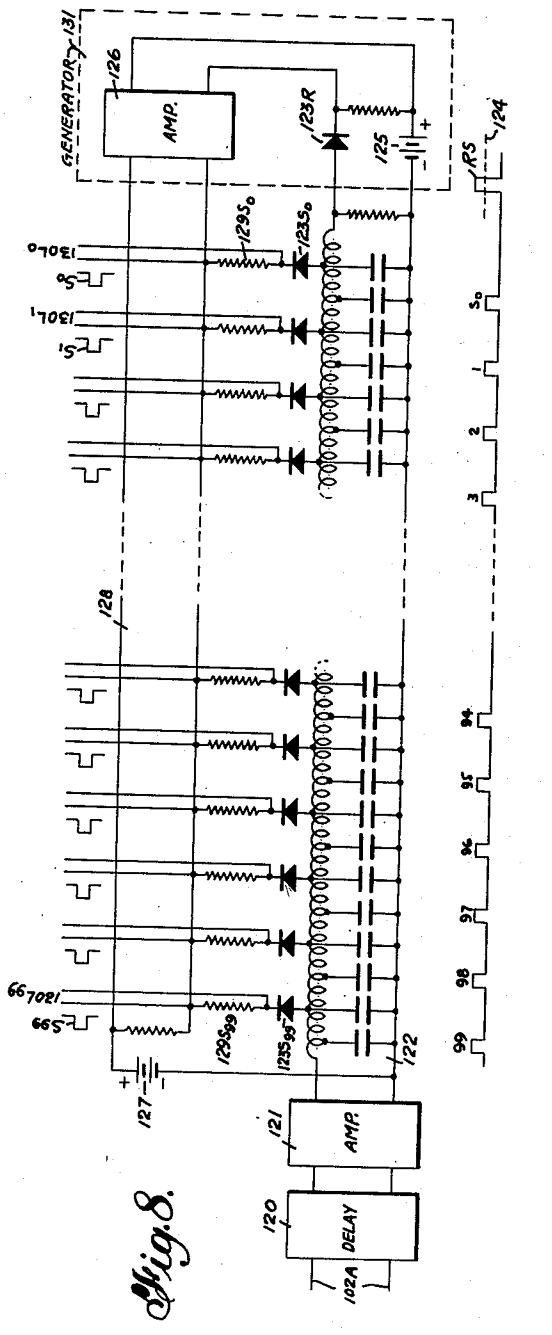
Figure 11:
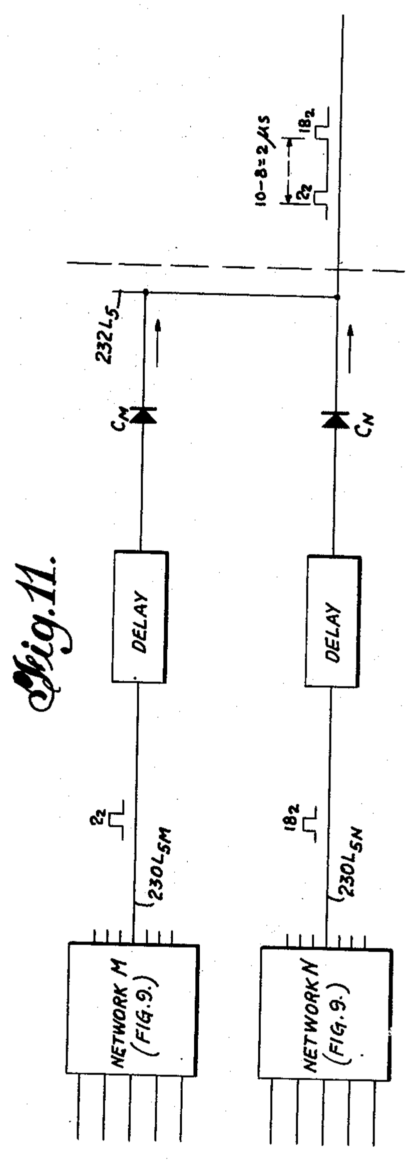
Figure 9A:
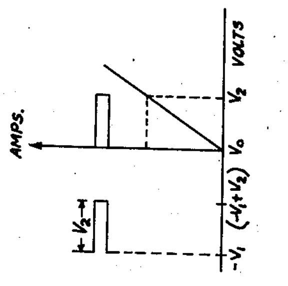
Figure 9:
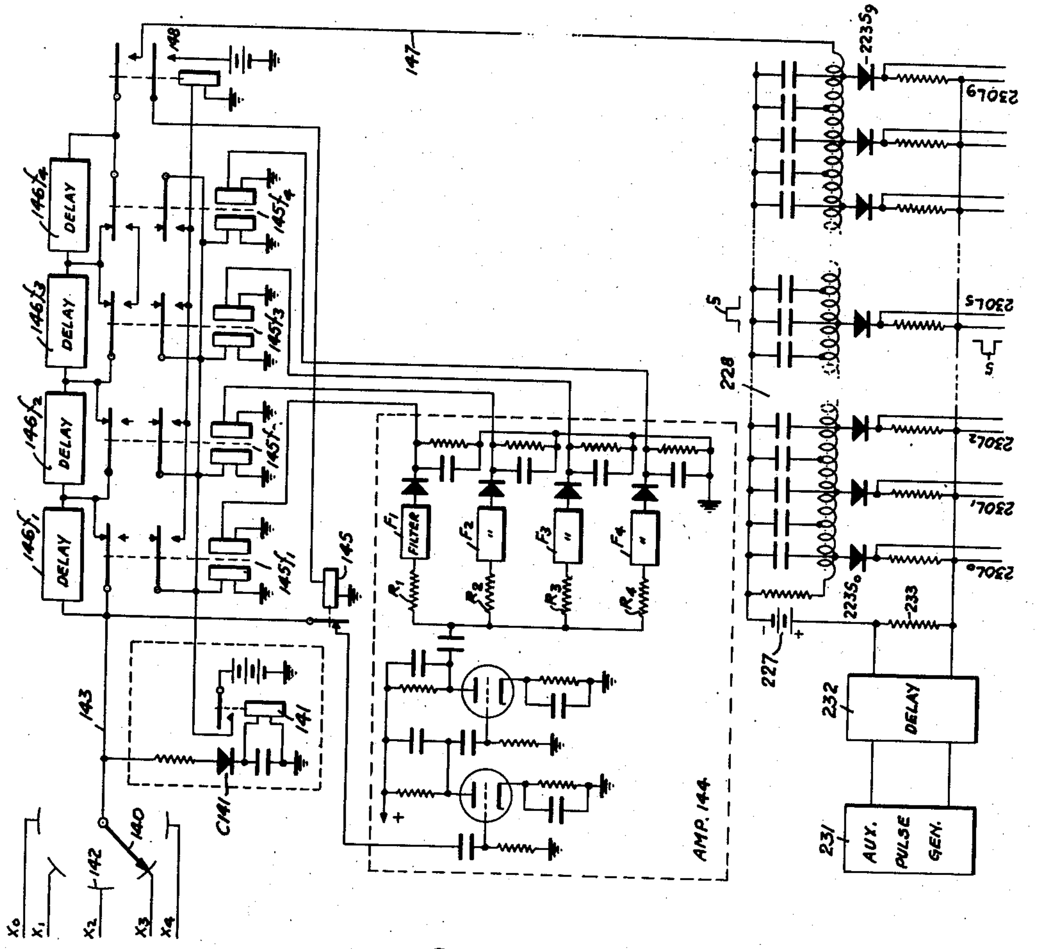
Figure 10:
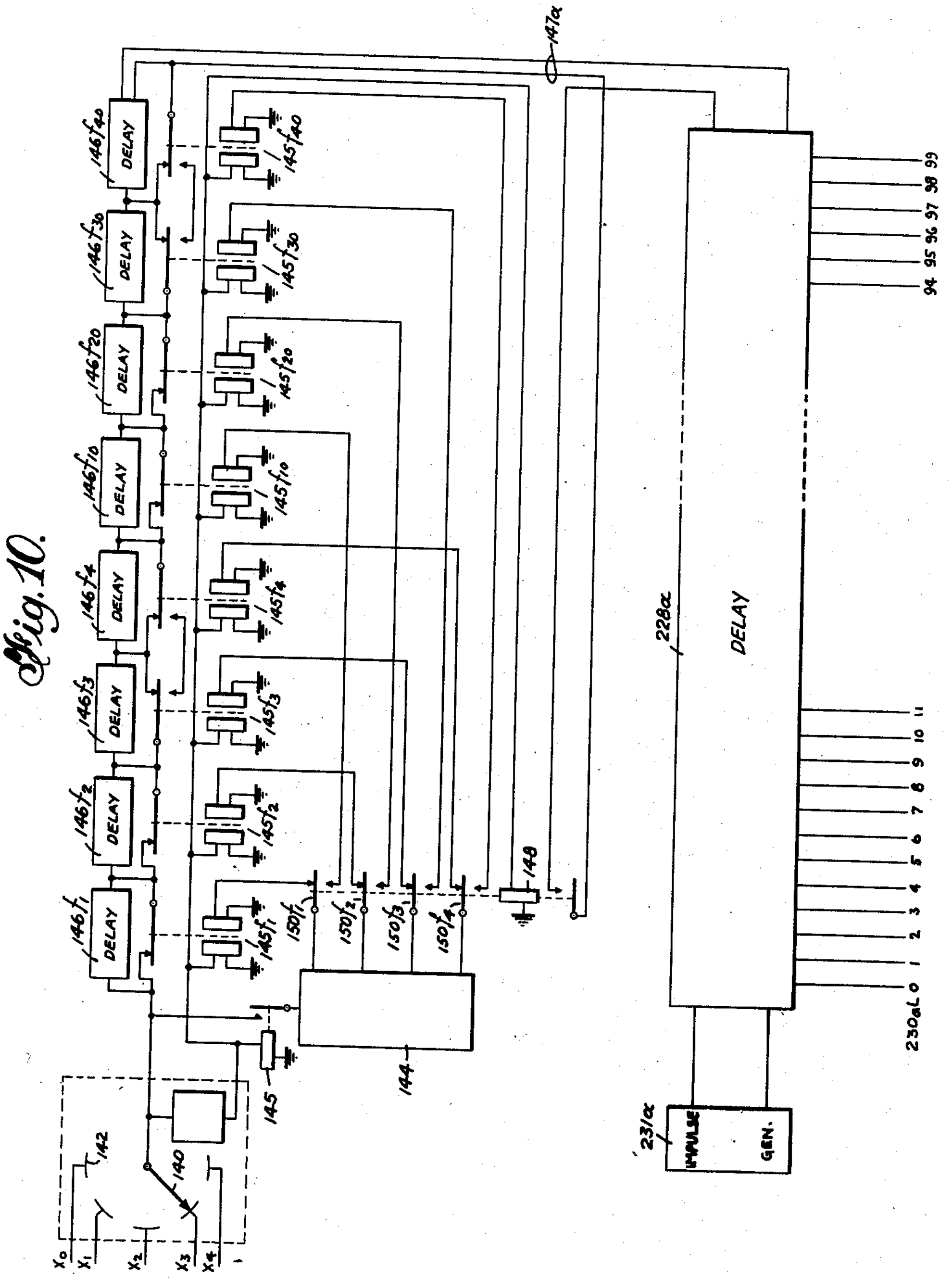

Fig. 3*a* is a transverse cross-section of a typical cable comprising a common line represented in Fig. 3;

Fig. 4 is a block diagram of an embodiment of the invention in a multi-stage telephone system;

Fig. 5 shows the time relationship between station pulses, station reference pulses, exchange reference pulses and network reference pulses in the system represented in Fig. 4;

Fig. 6 illustrates the time relationship of Fig. 5 when setting up a call from one exchange to another exchange;

Fig. 7 illustrates diagrammatically the establishment of both intra-exchange and interexchange connections;

Fig. 8 shows the circuit arrangement of a network arranged to align and distribute to individual lines station pulses which reach the network in succession over a common line;

Fig. 9 shows a network responsive to signalling pulses representing a called station to align and distribute to an appropriate individual outlet pulses which reach the network in succession;

Fig. 9*a* shows the operating characteristics of uni-lateral conducting devices such as rectifiers which are used in the network of Fig. 9, Fig. 10 diagrammatically illustrates a modification of the network of Fig. 9 which is responsive to signalling pulses representing two different digits used in designating a wanted station, and Fig. 11 shows a layout diagram referred to in the explanation of Fig. 7.

Referring now to Fig. 1, the reference pulses R recur at fixed intervals of time, for example, every 100 microseconds (ms.) and between each two successive reference pulses, 100 relatively small amplitude pulses $s$ may be produced each of which is characteristic in time position of a different sub-station and is identified in the drawings by the reference letter $s$ followed by its sub-station number (e. g. $s_1$, $s_2$ . . . $s_{99}$). The width of each pulse $s$ as illustrated in 0.49 ms. and the spacing between adjacent $s$ pulses is 0.99 ms. The higher the number of the sub-station the further is each of its characteristic pulses separated in time from the preceding reference pulse R.

Fig. 2 illustrates for one type of system the transmission sequence of pulses when sub-stations $S_2$, $S_6$, $S_{12}$ and $S_{96}$ out of the 100 sub-stations connected with the common line have initiated calls at the same time. In this type of system each sub-station generates its own $s$ pulses appropriately delayed with respect to the reference pulses R. However, both the $s$ and R pulses may, if desired, be generated at the central network, the $s$ pulses being continually present in the common line at very low levels but the amplitude of the $s$ pulses characteristic of a particular sub-station being increased when that sub-station initiates a call. In still another possible arrangement the sub-stations may be represented by $s$ pulses which follow the reference pulses by a first fixed time interval when the particular station is in a non-calling condition but by a different fixed time interval when it is in a calling condition, that is, the calling condition is represented by a slight time displacement of the $s$ pulses from their normal time positions.

As will be seen from Fig. 2, the spacing of substation pulse $s_2$ from the preceding reference pulse R is 2.97 ms., that of sub-station $s_6$, 6.93 ms., and that of sub-station $s_{12}$ 12.87 ms.

Fig. 3 illustrates diagrammatically a network comprising multiple substations $S_0$, $S_1$, $S_2$, $S_3$ . . . $S_{99}$ connected in parallel with a common cable comprising lines 101, 102 and 103. The reference pulses R which control the timing of the $s$ pulses of a group of 100 substations are sent from the central office over the line 101. Between the central office and in series with line 101 there is interposed a delay network $L_0$ designed to delay the reference pulses by an amount equal to the difference between the predetermined time interval by which the $s_0$ pulses are to follow the reference pulses R and the time required for the transmission of an R pulse to station $S_0$ from the central office over line 101 and for the transmission of an $s$ pulse back to the central office from the station $S_0$ over line 102. Thus reference pulses which are supplied at the central exchange and $s_0$ substations pulses reaching the exchange over line 102 will be properly separated in time. A similar delay network $L_1$ is interposed in series with line 101 between the points thereof at which substations $S_0$ and $S_1$ are respectively connected to line 101. This delay network $L_1$ delays the reference pulses by an additional time interval which is equal to the difference between the time interval by which the $s_1$ pulses are to follow the reference pulses and the delay resulting from cable losses. Other delay networks $L_2$ . . . $L_{99}$ are similarly connected in series along line 102 between its points of connection to successive parts of adjacent stations. In each substation there will be provided an $s$ pulse generator which is adapted to be triggered by the R pulses at the instants when they reach the generator. Thus, each station produces its own $s$ pulses at 100 ms. intervals properly retarded in time with respect to the reference pulses.

The $s$ pulses may be sent from any substation over line 102 towards the central office or exchange, voice modulated at that station in any known manner, and the substations are able to receive over line 103, $s$ pulses which have been modulated at any other substation.

As illustrated in Fig. 3A, the lines 101, 102 and 103 in practice each comprise coaxial cables or shielded pairs enclosed within a common sheath 107.

Fig. 4 shows in block diagrammatic form the method of connecting a calling substation associated with an exchange A with a called substation associated with an exchange B. There are indicated five lines 102A, associated respectively with five groups of substations belonging to the exchange A, and one line 103B associated with one group of substations belonging to exchange B. These all comprise common lines, that is, lines over which groups of $s$ pulses are transmitted simultaneously, each $s$ pulse having its characteristic time position with reference to the R pulses, as explained above. They correspond to the like-numbered lines shown in Fig. 3. Each line 102A terminates at the exchange A in an aligning network 110A, the function of which is to align the impulses arriving from the calling substations. The construction of an aligning network is illustrated in greater detail in Fig. 8. The aligned impulses are transmitted to a switching position 111A.

The first three digits of the called number sent by a calling station produce a delay in the $s$ pulses of a calling substation on line 102A which causes the call to be automatically routed towards the called exchange B. As indicated in Fig. 4, the networks 110A and the switching position 111A are connected to a synchronising means 112A in order to maintain the relative positions of the pulses within the exchange A.

From the switching position 111A the calling pulses are directed over a cable 113A or other transmission medium to an aligning network 114B at the called exchange B. The pulses received by the aligning network 114B are aligned with respect to the reference pulses of the exchange B and transmitted over separate circuits 115B to a receiving switching position 116B. To do this the reference pulse RN1 of the network to which the station belongs is inserted periodically between two of the incoming pulses at the input of the aligning network 114B, as for instance, by the synchronizing means 119B.

The thousands and hundreds digits dialed by the calling station will produce a delay causing the automatic routing of the call in the same manner as at the transmitting switching position 111A. The pulses are directed towards aligning receiving means 117B which aligns the pulses received with the reference pulses of the called cable 103B.

The tens and units digits of the called number produce a predetermined delay to align pulses with the pulse representing the called station.

At the called exchange B the networks 117B and the receiving switching position 116B are connected to a common synchronising means 119B which insures that the pulses of the called station reach the calling station via the transmission circuits of exchange B and the receiving circuits of exchange A.

Fig. 4 illustrates only the transmitting portion of the exchange A and the receiving portion of exchange B, but it should be understood that both exchanges are provided with receiving, as well as transmitting sides, as indicated in Fig. 7.

In order to render the preceding description clearer, the relative positions of the pulses in the different parts of the connection will now be explained with reference to Fig. 5.

The pulse $s_{10}$ appearing on the top lines (4) represents a station pulse of substation $s_{10}$ which is assumed to be connected to a cable No. 40 the characteristic reference pulse of which is indicated at RS40. The pulse $s_{10}$ will be 10.89 ms. from the preceding reference pulse RS40.

The cable No. 40 is connected with a central exchange No. 20 which might, for example, be the exchange A and which is identified by a reference pulse RE20, produced in the switching circuit 111A. Since the subscribers' cable No. 40 is the fortieth which leads to exchange No. 20, the reference pulse RS40 is spaced (as indicated in line 3 of Fig. 5) 39.6 ms. from the exchange reference pulse RE20. The reference pulses RS1 to RS39 of the other cables will be between the preceding exchange reference pulse RE20 and reference pulse RS40, and the reference pulses RS41, RS42, etc., of other cables will have a time position between RS40 and the succeeding exchange reference pulse RE20.

Similarly, the exchange reference pulse RE20 (line 2, Fig. 5) identifying exchange 20, is spaced 19.8 ms. from the reference pulse RN1 (line 1, Fig. 5) identifying the exchange network or system to which the exchange 20 belongs. The other exchange reference pulses RE will be to the left and right of exchange reference pulse RE20. The subscribers' cable reference pulse RS40 is spaced 59.4 ms. from the network reference pulse RN1.

Thus it will be seen that the same relationship exists between the reference pulses identifying the exchange and those identifying an exchange belonging to the network as between an exchange and its subscribers' cables or sub-divisions. One switching stage is keyed to other switching stages by means of the time position of the reference pulses of the switching stages. The total number of such switching stages depends, of course, on the size of the exchange but the operations to be performed are of the same general nature in all the switching stages.

Line 1 of Fig. 6 shows a reference pulse RS40 of the calling subscribers' cable and ten substation pulses. Line 2 shows the reference pulses REX representing the exchange in which the cable terminates and the time displacement between REX and R40 may be represented by $t2$.

The system or network to which the exchange X belongs is represented by the reference pulses RN1 which are spaced 100 ms. apart, as indicated on line 3 of Fig. 6. The time displacement of reference pulses REX with respect to pulses RN1 is represented by $t1$. The signals or series of pulses indicated on line 1 is, therefore, spaced from the network reference pulse RN1 by distances of $t1+t2$ or $t3$. Thus the pulses produced in the calling substation line (line 1 of Fig. 6) must be delayed $t_3=100-(t1+t2)$.

The sequence of pulses received from the calling substation lines will, therefore, be spaced from the reference pulse RN1 of the network in the same manner as from the reference pulses RS40 of the incoming cable. This is shown on line (4) of Fig. 6.

An aligning network separates the impulses received from the calling cable and places the pulses received from each substation on a separate circuit.

Referring now to Fig. 7, the pulses $s_{18}$, $s_{12}$, $s_2$, representing the three calling stations S2, S12 and S18 on cable No. 40, as well as the reference pulses RS40 of the cable, arrive over line 102A at the aligning network 110A of exchange A. The network 110A will align these pulses so that each will emerge therefrom at the time of reference pulse RS40 on a separate circuit as shown at $2_1$, $12_1$, and $18_1$, connected to a transmitting switching circuit 111A.

Depending on the first digit or digits of the called number dialed to the switching circuit 111A, the pulses $12_2$ of substation 12 will be routed as described later towards a receiving alignment network 114A of exchange A, and the pulses $2_2$ and $18_2$ towards receiving alignment network 114B of exchange B.

The pulses $2_2$ and $18_2$ can be present at different times on the same line extending from 111A to 114B because they come from different switching circuits such as Fig. 9. Their time position is different because each circuit such as Fig. 9 has its characteristic timing which may be obtained for example as will now be described with reference to Fig. 11. In this diagram switching networks M and N are similar to Figure 9. Since the called numbers (from M and N) correspond to the same exchange B the outputs of the two networks will correspond respectively to the lines $230L_{5M}$ and $230L_{5N}$. The two pulses $2_2$ and $18_2$ have to be transmitted to the exchange B by the same line 232L5 which can carry one hundred pulses provided that they have different timing. Then if we assume that the pulses $2_2$ and $18_2$ and also all the other pulses coming from all the networks (similar to Figure 9) have the same timing when the exchange B is called it is possible to give at each network such as M, N, O, P . . . etc. a specific delay different for each network. In that condition a multiplicity of pulses can be present in the same period of time on the cable 232L5 between exchanges A and B. The maximum number of pulses is limited by the width of the pulses corresponding to each channel. In the chosen example this number of pulses is one hundred at the maximum. The crystal rectifiers $C_M$ and $C_N$ which conduct in the direction of the arrows permit the pulses coming from networks M and N to pass to the common line 232L5 and prevent any pulse present (at different time) on the line 232L5 from passing back into the networks such as M, N, O, P etc.

It will be clear also that other arrangements can be utilized, for example, by grouping at the input of the network M all the circuits corresponding to a given characteristic timing, and at the input of the network N all the circuits corresponding to another characteristic timing, and so on for the other networks such as O, P, Q . . . etc. This arrangement avoids the use of additional delay lines (such as shown in Fig. 11) and permits the use of the normal delay existing at the output of each cable.

At exchange B the output of alignment circuit 114B will align the pulses $2_2$ and $18_2$ in separate trunks leading towards the receiving switching circuit 116B from which responsive to the thousands and hundreds digits of the called number the pulses are sent in succession into an aligning circuit 117B and thence over the switching circuit 118B, which is responsive to the tens and units digits, to the receiving circuits of the called cable 103B of exchange B where the pulses $2_4$ and $18_4$ occupy the same positions with respect to the reference pulse RS40 as the called stations occupy on the line with respect to the reference pulse of the receiving line 103B.

The transmitting branch 102B of this cable is shown as carrying a pulse representing station 5 and a reference pulse RS$x$. Assuming that the called station is on cable No. 40 at exchange A, these pulses are received and the station pulses aligned in network 110B routed to the called exchange A over the transmitting switching circuit 111B of exchange B to the receiving alignment circuit 114A of exchange A. In the output of 114A pulse $5_3$ will be aligned with pulse $12_3$ which originated on line 102A and routed over receiving switching circuit 116A, alignment network 117A, and switching circuit 118A. The pulses $12_4$ and $5_4$ will be directed over the receiving branch 103A of the called cable No. 40, so spaced with respect to reference pulse RS40 that they will reach, respectively, only substations 5 and 12 connected with this cable.

Fig. 8 illustrates the details of the aligning circuits indicated by the blocks 110A, 114A, 117A, 110B, 114B, 117B of Figs. 4 and 7.

At the left hand side of the figure are indicated the two conductors of, say, the line 102A over which a sequence or block comprising a maximum of 100 *s*-pulses may be sent to the exchange from a group of one hundred substations. The line 102A leads to a delay network 120 for adjusting the time of arrival of these pulses at the central exchange and thence to an amplifier 121. The relative positions of the delay network 120 and the amplifier 121 are immaterial and in some cases one may dispense with an amplifier altogether. In any event the delay network and the amplifier may be of suitable known construction.

The output of the amplifier 121 is fed into a delay line 122 whose electrical length is equal to the duration of the pulse sequence, which in the present case consists of a reference pulse RS followed by a maximum of 100 station pulses *s0–s99*. These pulses will be distributed along the delay network 122*s0* that when a reference pulse RS reaches a rectifier 123R the station pulse *s0* will be aligned with an output branch 130L0 of the network 122 which contains rectifier 123*s0*, the pulse *s1* will be aligned with the branch 130L1 containing rectifier 123*s1*, etc. and the pulse *s99* will be aligned with the branch 130L99 of the network 122 which contains the rectifier 123*s99*.

The amplitude of reference pulses RS is larger than that of the station pulses *s*, and the reference pulses will be clipped along the dotted line indicated at 124 (Fig. 8) by the detector 123R which is so polarized or biased by battery 125 that only the portion of pulse RS above line 124 will be fed to an amplifier 126.

Normally the detectors 123*s0*–123*s99* are so polarized by a battery 127 that they block the passage of the pulses *s*. When, however, the output of amplifier 126 is fed to circuit 128 then for a brief period of time determined by the width of the reference pulse RS, the rectifiers 123*s0–99* will be unblocked and permit the stored impulses $S_0$ to $S_{99}$ to change the voltage impressed on impedances 129*s0*–129*s99*. Each of these impedances terminates a different output branch line 130L0, 130L1, 130L2, 130L3, etc., 130L99, producing in each line 130L a pulse corresponding to one of the pulses *s* sent over circuit 102A. The substation pulses will thus be aligned in the lines 130L whereby the network, shown in Fig. 8 and corresponding to, say, 110A of Fig. 7, affords a temporary individual line 130L for each one of the substations S of Fig. 3. Of course, there will be pulses only on these lines 130L which correspond to calling substations S, in the case assumed in Fig. 7 on lines 130L2, 130L12 and 130L18.

Similarly, when the network of Fig. 8 is used at any other point, say at 114A or 117A, it will provide a separate individual output channel 130L for each sequential pulse that may reach it over a common channel.

It will be obvious to those skilled in the art that an electro-magnetic or electronic distributor or finder switch may be provided at the input of the delay network of Fig. 8 to insure more effective utilization thereof than is the case when the network is permanently connected to the cable serving 100 substations. Such distributors are well known and one embodiment is shown in Fig. 9 in association with a switching position such as 111A.

A wiper 140 which may consist of a set of brushes of a switch or the beam of a cathode ray tube is constantly rotated so long as a relay 141 is de-energized. The wiper 140 sweeps over contacts 142 which serve as terminals for the respective cables, e. g., X0, X1, X2, X3 or X4.

Assuming that the wiper 140 sweeps over the five terminals 142 in $\frac{1}{10}$ of a second, the initiation of a call on line X3 is indicated by the production of 10,000 pulses per second thereon. Depending on the position of wiper 140, and thus at the latest within $\frac{5}{10}$ of a second after the call appears on line X3, the line pulses will reach line 143 connected with the wiper 140, and also over rectifier C141, through sensitive relay 141, which becomes energized and stops the wiper 140 on the terminal 142 of line X3 in a manner well known in the machine switching art. Relay 141 closes a circuit from battery over the holding windings of relays 145*f1–f4*. These relays are of the type which responsive to energization of their holding windings only will not attract their armatures but after the energization of their right hand actuating windings, completion of their holding circuits will maintain their armatures attracted even after deenergization of the actuating windings.

Each substation is provided with known means for producing currents of four different frequencies which may be combined into a code of ten numbers. Preferably these four frequencies are within one octave, whereby the second harmonic of any of these frequencies cannot fall within the range of the calling number frequency band. The centers of adjacent frequencies may, therefore, be sufficiently spaced to avoid confusion and these frequencies should preferably be outside of the range of the audible frequencies. They may, for instance, be between 100 and 200 cycles, e. g. *f1* 100 cycles, *f2* 122 cycles, *f3* 148 cycles and *f4* 180 cycles. The ten possible combinations of these frequencies may be #1=*f1*, #2=*f2*, #3=*f1*+*f2*, #4=*f3*, #5=*f1*+*f3*, #6=*f2*+*f3*, #7=*f4*, #8=*f1*+*f4*, #9=*f2*+*f4*, and 0=*f3*+*f4*.

A group of four filters F1–F4 is normally connected over an amplifier 144 and decoupling resistors R1–R4 to the line 143 over contacts of a relay 145. These filters are band pass filters of any known construction, each tuned to a different one of said frequencies *f1–f4*. Relays 145*f1*, 145*f2*, 145*f3*, 145*f4* are, respectively, connected to the outputs of the filters F1–F4 over rectifiers. Normally back contacts of relays 145*f1*–145*f4* short-circuit associated delay networks 146*f1*, 146*f2*, 146*f3*, and 146*f4*. When a relay 145*f1–4* becomes energized because its corresponding filter F1–F4 permitted the passage thereto of current of the appropriate frequency, the relay will move its armature away from its back contact and thus permit the insertion of the associated delay network 146*f1–4* into the line 143 which is now connected via wiper 140 with the calling line X3.

The delay network 146 will delay the station pulses to an extent determined by the called number, and thus delay networks 146 may produce a code corresponding to ten different numbers. A delay will be produced when all the four relays 145*f1–4* remain de-energized; one unit of delay is produced by network 146*f1* when only relay 145f1 is energized; two units of delay are produced by network 146f2 when only relay 145f2 is energized; four units of delay are introduced by network 146f3 when only relay 145f3 is energized; and seven units of delay are introduced by network 146f3 when only relay 145f4 is energized.

The unit of delay may be of any suitable value, e. g. between one-half and ten microseconds, but since it is correlated with the timing of the pulses in the other circuits it is made equal to .98 microsecond, i. e. to the time afforded for each station by the spacing between two station pulses *s*. The ten units of delay may be introduced in the circuit illustrated in Fig. 9 so as to produce the following results when a digit from 1 to 0 is dialed:

Dial 1—frequency $f_1$; relay 145$f_1$ energized; delay network 146$f_1$ cut in; one unit of delay.

Dial 2—frequency $f_2$; relay 145$f_2$ energized; network 146$f_2$ cut in; 2 units of delay.

Dial 3—frequencies $f_1$ and $f_2$; relays 145$f_1$ and 145$f_2$ energized; networks 146$f_1$ and 146$f_2$ cut in; 3 units of delay.

Dial 4—frequency $f_3$; relay 145$f_3$ energized; network 146$f_3$ cut in; 4 units of delay.

Dial 5—frequencies $f_1$ and $f_3$; relays 145$f_1$ and 145$f_3$ energized; networks 146$f_1$ and 146$f_3$ cut in; 5 units of delay.

Dial 6—frequencies $f_2$ and $f_3$; relays 145$f_2$ and 145$f_3$ energized; network 146$f_2$ and 146$f_3$ cut in; 6 units of delay.

Dial 7—frequency $f_4$; relay 145$f_4$ energized; network 146$f_4$ cut in; 7 units of delay.

Dial 8—frequencies $f_1$ and $f_4$; relays 145$f_1$ and 145$f_4$ energized; networks 146$f_1$ and 146$f_4$ cut in; 8 units of delay.

Dial 9—frequencies $f_2$ and $f_4$; relays 145$f_2$ and 145$f_4$ energized; networks 146$f_2$ and 146$f_4$ cut in; 9 units of delay.

Dial 10—frequencies $f_3$ and $f_4$; relays 145$f_3$ and 145$f_4$ energized; short circuiting networks 146$f_3$ and 146$f_4$; 0 units of delay.

Whenever a relay 145f1-4 is energized over its right-hand actuating winding it holds over its holding winding after deenergization of its actuating winding. Relay 148 also becomes energized and over its upper contacts extends the dialling circuit to the next selecting stage, and relay 145 also becomes energized, whereby the next digit is prevented from reaching the filters F1-F4.

When a subscriber hangs up or some other indication is given that line X3 is no longer in a calling condition, the relay 141 immediately becomes de-energized allowing the distributor brush 140 to continue its rotation. Deenergization of relay 141 causes the release of relays 145, 146 and 148.

At the time that the call on line $X_3$ stops the distributor 140 on the No. 3 terminal 142, the circuits of relays 145$f_1$–145$f_4$ are closed, whereas the circuit of relay 148 is open. For instance, the dialing of digit 5 sends over line 143 frequencies $f_1$ and $f_3$, whereby through the agency of two of the filters F1 and F3, relays 145$f_1$ and 145$f_3$ are energized and relay 148 is energized, which introduce by means of networks 146$f_1$ and 146$f_3$ five units of delay in the line 147 as compared to the line 143.

The pulses sent over line X3 and selectively delayed by networks 146f1 and 146f3 will, therefore, be sent into the delay line 228 whose total length corresponds to ten of said units of delay. Ten equally spaced lines 230L0, 230L1, 230L2 . . . 230L9 are uniformly branched off the delay network 228, each containing a detector 223s0-223s9. A battery 227 so polarizes these detectors that they will normally offer infinite impedance to the passage of pulses from network 228. An auxiliary pulse generator 231 connected with the network applies unblocking pulses over a ten unit delay line 232 to the terminals of a relatively small resistance 233.

Lets us assume that the magnitude of this pulse is at least equal to $-V_1$ and that the ampere-volt characteristics of the detectors 223 are as represented in Fig. 9A in which $V_2$ is the amplitude of each positive pulse received on the network 228 and the resultant amplitude $-V_1+V_2$ produces no current in the rectifier. While the pulse $-V_1$ persists, the detector 223 will be polarized at least to the potential $V_0$ or more. At this instant the pulse having no delay will be at detector 223s0 and the pulse having five units of delay will be at detector 223s5.

The ten detectors 223 to which $V_0$ polarizing voltage is applied under the control of the unblocking pulses received from generator 231, permit the passage of pulses having an amplitude of $V_2$ (Fig. 9A). The impulse representing digit 5 will therefore reach line 230L5 at the same time as impulse which has 0 units of delay reaches the line 230L0. However all the pulses which reach the lines 230L will have the assumed delay of ten units with respect to the reference pulse of the network which, through the agency of 231, controls the alignment just described. Since this reference pulse is a constantly recurring pulse, it may be given a sufficient advance so that once the called exchange is reached the reference pulse will be aligned therewith.

If, for instance, three digits must be dialed to reach the called exchange, then all calls must pass through three circuits like the one shown in Fig. 9, and will reach the called exchange with a delay of thirty units, or 29.4 microseconds.

Again referring to Fig. 8, it is noted that the detector 123R and amplifier 126 are within a dotted square 131 to indicate that they may be replaced by an impulse generator synchronized to the reference pulse of the central exchange to which they belong and which corresponds to the generator 231 of Fig. 9.

It will be obvious to those skilled in the art the unidirectional devices or detectors indicated in these figures may be of any suitable type, e. g., dry rectifiers or vacuum tubes. For instance, an amplifying pentode may be used whose control grid is connected to the delay line and the cathode to the common return path. Such a pentode may be blocked by the absence of plate potential and may be unblocked by an impulse applied to the plate. The blocking of such a tube may be affected by the biasing of its cathode or grid or control grid or suppressor grid. The unblocking may be effected by applying a pulse of suitable amplitude and direction at the desired time.

According to another modification the calling lines may delay the pulses to such an extent that two or three successive digits of the called number will be indicated. Such an arrangement responsive to two digits is shown in Fig. 10.

All elements in Fig. 10 which bear the same reference numerals as in Fig. 9 perform the same functions. The first delay line comprises in addition to the delay networks 146$f_1$, 146$f_2$, 146$f_3$ and 146$f_4$ and the associated control relays 145$f_1$–145$f_4$, four additional delay networks 146$f_{10}$, 146$f_{20}$, 146$f_{30}$, and 146$f_{40}$ arranged to introduce a delay ten times as great as the delay introduced by 146$f_1$–146$f_4$. Relays 145$f_{10}$, 145$f_{20}$, 145$f_{30}$ and 145$f_{40}$ are associated with these additional delay networks and are provided with contacts to cut them in and out of the circuit in the same manner as relays 145$f_1$–145$f_4$ control the first group of delay networks.

The first delay line may be associated over a line 147$a$ with the second delay line 228$a$ under the control of relay 148. Line 228 of Fig. 9 has an electrical length equal to ten units of delay and could accommodate only ten lines 230$L_0$ to 230$L_9$. Line 228$a$ has a length equal to one hundred units of delay and accommodates one hundred lines 230$aL_0$–230$aL_{99}$. An impulse generator 231$a$ sends into line 228$a$ pulses spaced by one hundred units of delay. If the unit of delay is equal to the time generally reserved for each substation, then the generator 231$a$ may be dispensed with and the reference pulse of the exchange may be applied to the line 228$a$ as in Fig. 8.

The operation of Fig. 10 is as follows:

When a call is initiated on one of the lines $X_0$–$X_4$, the brush 140 will stop on the terminal 142 of the calling line, relay 145 becomes energized, as does relay 141 to top the finder 140. The circuits of relays 145$f_1$–$f_4$ and 145$f_{10}$–$f_{40}$ are closed. The relay 148 is deenergized. The relay 148 is in a position in which its four armatures 150$f_1$, 150$f_2$, 150$f_3$, and 150$f_4$, connect the four filters of 144 with relays 145$f_1$–$f_4$, respectively. The first digit over the calling line will, therefore, operate one or more of these four relays as in the circuit of Fig. 9 and the instant this happens the relay 148 is energized and moves its armatures 150 into engagement with the lower set of terminals to disconnect the filters 144 from relays 145$f_1$–$f_4$ and connect them to the windings of relays 145$f_{10}$–$f_{40}$. Relay 145 remains energized. The next digit dialed over the calling line will operate one of the relays 145$f_{10}$–$f_{40}$ in order to introduce into the line 143 an additional delay which is ten times as great as the delay introduced when the preceding digit was dialed. The energization of any one of the relays 145$f_{10}$–145$f_{40}$ will cause the deenergization of relays 148 and 145 as in Fig. 9.

The impulse sent out over line 147$a$ will have a delay of 0–9 delay units produced by the insertion of networks 146$f_1$–146$f_4$ in certain combinations, and an additional delay of 0–90 units introduced by a suitable combination of networks 146$f_{10}$–146$f_{40}$. If, for instance, first the digit "5" and then the digit "9" were dialed, then a total delay of 95 units will be produced, and the delay line 228$a$ will receive the unblocking signal when the pulse arriving over line 147$a$ is opposite outgoing line 230$aL_{95}$. The pulses appearing on the outgoing lines will all be aligned.

Obviously, delay networks may be provided in the system illustrated in Fig. 10 which would introduce delays of hundreds of units. This would require a much longer delay line 228$a$ and the sending by generator 231$a$ of an unblocking impulse for every ten normal pulses, introducing a transmission delay of one thousand microseconds.

What I claim is:

1. In a communication system a plurality of transmitting networks from which a plurality of separate signals are to be transmitted, a plurality of receiving networks each adapted to receive a plurality of separate signals, a plurality of selecting networks, each of said transmitting networks being connected to a receiving network by a single transmitting medium, each of said transmitting networks comprising means for producing a plurality of repetitive pulses on the associated transmitting medium at the same rate of repetition and spaced from each other in time, there being one pulse for each signal to be transmitted, means for modulating said pulses respectively with said signals, and means for producing a reference pulse at the same repetition rate as said signal pulse which has a different time position from reference pulses of other transmitter networks and provides an identification for said transmitting network, each of said receiving networks comprising a delay line, a plurality of output lines connected at spaced points along said delay line, there being one output line for each signal to be received and the delay between any two adjacent points being equal to the time displacement of the respective corresponding pulses, means for normally blocking said output lines, and means responsive to the receipt of a reference pulse for simultaneously unblocking said output lines at a time when said signal pulses are at respective points in said delay line at which said output lines are connected, whereby one signal pulse is applied to each output line, each of said selecting networks comprising means for connecting said network to an output line of a receiving network, a delay line, a plurality of output circuits connected at spaced points to said delay line and representing directions to be selected, means connected between said connecting means and said delay line and responsive to directive signals appearing as modulation of a received signal pulse for delaying said received signal pulse for a time period corresponding to the desired direction to be selected and equal to the delay of the point on said delay line corresponding to said direction, means for normally blocking said output circuits, means for producing an auxiliary pulse having the same repetition rate as said signal pulses and at a time different from the times of auxiliary pulses of other selecting networks serving the same directions, and means for utilizing said auxiliary pulse for simultaneously unblocking said output circuits at times corresponding to the times that a delay pulse will pass an output circuit, whereby a delay pulse passing through said delay line will be applied to the desired output circuit.

2. In a communication system, the combination, as defined in claim 1, in which the means for normally blocking the output lines of a receiving network comprises a rectifier in each output line, means for normally biassing said rectifiers so that the pulse can not pass therethrough, and the means for unblocking said output lines comprises means responsive to the received reference pulse to alter the bias on said rectifiers to permit the time spaced pulses in said delay line to pass simultaneously on to said output lines.

3. In a communication system, the combination, as defined in claim 2, in which the means for normally blocking the output circuits of a selecting network comprises a rectifier in each output circuit and means for normally biassing said rectifiers so that the pulse can not pass therethrough, and the means for unblocking said output circuits comprises means for producing a recurring auxiliary pulse at the repetition rate of the received pulse, and means for utilizing said auxiliary pulse for altering said bias to permit the passage of a pulse through said rectifiers at the time of said auxiliary pulse.

4. In a communication system, the combination, as defined in claim 1, in which the means for normally blocking the output circuits of a selecting network comprises a rectifier in each of said circuits and means for normally biassing said rectifiers to prevent the transfer of pulses therethrough and the means for unblocking said output circuits comprises means for producing a recurring auxiliary pulse at the repetition rate of the received pulse, and means for utilizing said auxiliary pulse for altering said bias to permit the transfer of a pulse through said rectifiers at the time of said auxiliary pulse.

5. In a communication system, a plurality of transmitting stations divided into groups, a plurality of selecting stages, single transmission media for respectively connecting groups of stations with selecting stages, means for producing a recurring reference pulse on each transmitting medium, said pulse being spaced in time from the pulses on the other transmitting media, means for transmitting signals from the calling station of each group as modulated pulses on the associated transmitting medium, respectively spaced in time from said reference pulses, aligning means at each selecting stage comprising a delay line and a plurality of output lines connected at spaced points to said delay line, there being one output line for each signal to be received and the delay between any two adjacent points being equal to the time displacement of the respective coresponding pulses, means for normally blocking the flow of pulses from said delay line to said lines, means responsive to a received reference pulse for unblocking said lines to permit pulses in said delay line to pass simultaneously on to said output lines, selecting means at each selecting stage adapted to be connected to one of said output lines and including a delay line, a plurality of output circuits connected at spaced points to said delay line, and means responsive to signals representing a direction and appearing as a modulation on a pulse passing through said selecting means for delaying said pulse by a time period corresponding to the desired direction and equal to the delay of the point on said delay line corresponding to said direction, means normally blocking said output circuits, and means for unblocking said output circuits at predetermined recurring times corresponding to the times when a delayed pulse is passing an output circuit, whereby a pulse delayed by said delaying means will be applied to a particular output circuit.

6. In a communication system, the combination, as defined in claim 5, in which the means for normally blocking the flow of pulses from the first mentioned delay line to the output line comprises a rectifier in each output line and means for normally biassing said rectifiers so that the pulses can not pass therethrough, and the means for unblocking said lines comprises means responsive to the received reference pulse to alter the bias on said rectifiers to permit the time spaced pulses in said delay line to pass simultaneously on to said output lines.

7. In a communication system, the combination, as defined in claim 6, in which the means normally blocking the output circuits of a selecting network comprises a rectifier in each output circuit and means for normally biassing said rectifier so that the pulse can not pass therethrough, and the means for unblocking said output circuits comprises means for producing a recurring auxiliary pulse at the repetitive rate of the received pulse, and means for utilizing said auxiliary pulse for altering said bias to permit the passage of a pulse through said rectifier at the time of said auxiliary pulse.

8. In a communication system, the combination, as defined in claim 5, in which the means for normally blocking the output circuits comprises a rectifier in each of said circuits and means for normally biassing said rectifiers to prevent the transfer of pulses therethrough, and the means for unblocking said circuits comprises means for producing a recurring auxiliary pulse at the repetitive rate of the received pulse, and means for utilizing said auxiliary pulse for altering said bias to permit the transfer of a pulse through said rectifier at the time of said auxiliary pulse.

9. In a communication system, the combination, according to claim 5, further comprising means for applying other pulses to said output circuits produced at different times from the outgoing circuits of other selecting stages, said pulses being spaced in time, and means for applying a reference pulse to each output circuit to form a train of signal pulses including a reference pulse.

JEAN JULIEN BAPTISTE LAIR.

References Cited in the file of this patent

UNITED STATES PATENTS

| Number | Name | Date |
|---|---|---|
| 2,172,354 | Blumlein | Sept. 12, 1939 |
| 2,262,838 | Deloraine et al. | Nov. 18, 1941 |
| 2,416,330 | Labin et al. | Feb. 25, 1947 |
| 2,418,116 | Grieg | Apr. 1, 1947 |
| 2,449,819 | Purington | Sept. 21, 1948 |
| 2,471,253 | Toulon | May 24, 1949 |
| 2,492,344 | Adams et al. | Dec. 27, 1949 |
| 2,508,602 | Peterson | May 23, 1950 |
| 2,513,335 | Labin et al. | July 4, 1950 |
| 2,541,076 | Labin et al. | Feb. 13, 1951 |
| 2,567,203 | Golay | Sept. 11, 1951 |